United States Patent Office 2,774,857
Patented Dec. 18, 1956

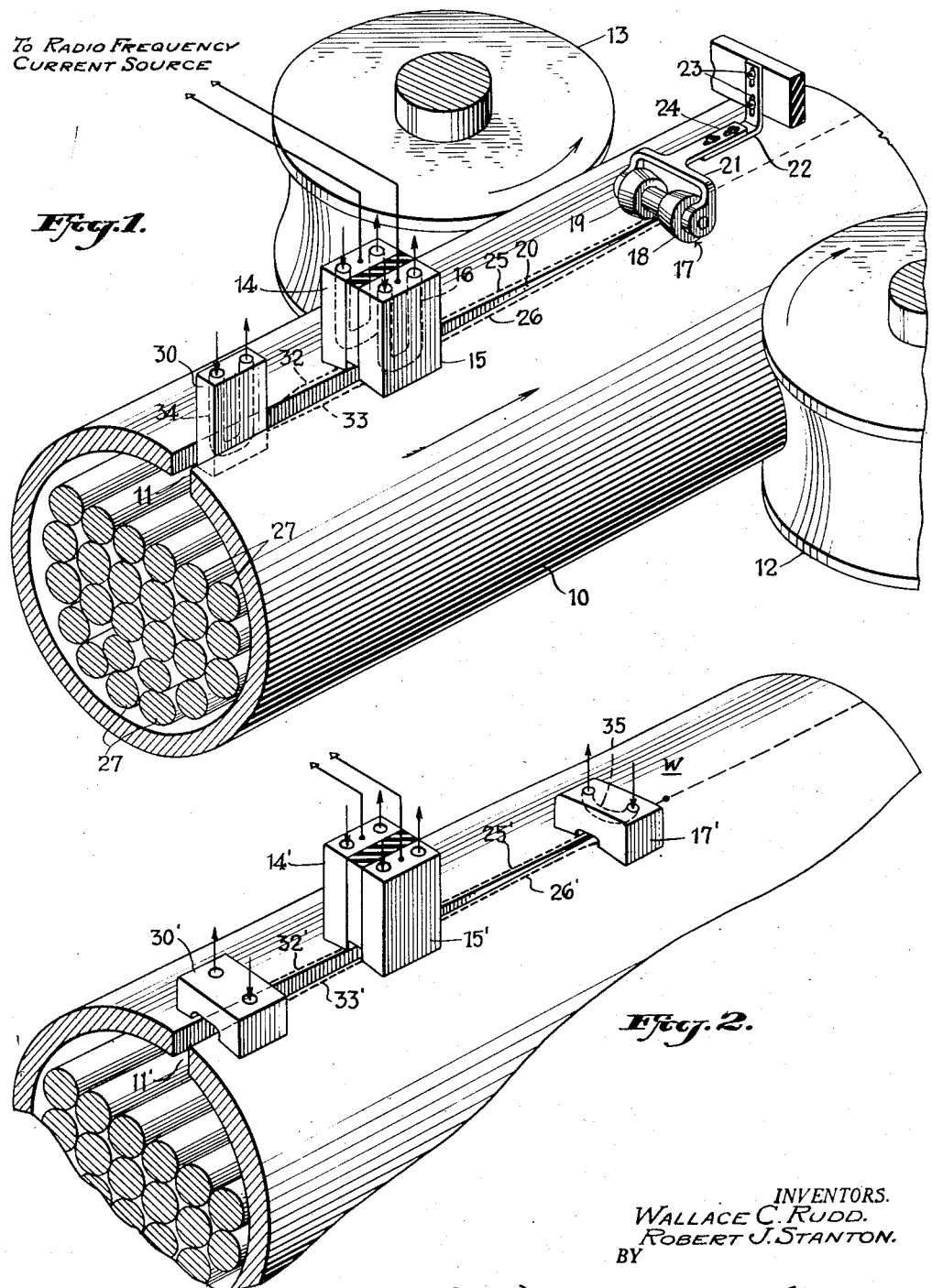

2,774,857

TUBE WELDING

Wallace C. Rudd, Larchmont, and Robert J. Stanton, Brooklyn, N. Y., assignors to Magnetic Heating Corp., New Rochelle, N. Y., a corporation of New York Application August 23, 1954, Serial No. 451,536

13 Claims. (Cl. 219—67)

This invention relates to the welding of tubing and the like by the use of high frequency current.

In our copending applications Serial Nos. 332,422, filed January 21, 1953, and 421,768, filed April 8, 1954, we have disclosed methods and apparatus for welding a longitudinal gap in tubing as it is being advanced through a tube mill, such method involving the application of radio frequency current to two slidable or rotary contacts applied respectively to the tube metal at opposite sides of the gap in the tubing shortly in advance of the point where the gap becomes closed and is welded, whereby the radio frequency current finds a path of lowest reactance from one of the contacts along one edge at the V-shaped gap to the weld point, thence back along the other edge of the gap to the second contact, the current flow being largely confined to the edges which are about to be welded. To insure further concentration of the current at said edges and to prevent any substantial flow of current circumferentially around the back of the tubing opposite from the gap, we have also disclosed and claimed in said application Serial No. 421,768, a combination involving the feature of mounting magnetic means or elements within the tubing, having the effect of greatly increasing the reactance of any such circumferential current paths.

While we have found the methods and apparatus above referred to, to be well adapted for welding either ferrous or non-ferrous metal tubing at an exceptionally rapid rate, using a relatively small amount of power, yet in some cases with such methods a small arc flame appears at the weld point and apparently, either because of such arc or the radio frequency electro-magnetic field effect occurring immediately adjacent the weld point, there is a tendency sometimes for small portions of the tube metal to be thrown out. Also with such methods, it has been found that sometimes the location of the weld point (that is, its distance from the contacts) may vary, thereby tending to cause variations in the resulting temperature at the weld point with some consequent variations in the uniformity of the weld.

In accordance with the present invention, the above-noted difficulties are overcome by bridging the V-shaped gap with a conducting member in the region over or just in advance of the weld point, so that at the weld point itself, no substantial current will flow and the region immediately adjacent such point is made free of any strong electromagnetic field effects. Thus a current path is provided from one contact on or adjacent one edge of the V-shaped gap, to extend along one side of such gap to a point in advance of the weld point, the current path thence running through a conductor element to the other side of the V-shaped gap and back to the second terminal contact of the radio frequency source. Thus the gap edges are rapidly and progressively heated as they approach the weld point, but are heated to the maximum degree shortly in advance of the weld point, further heating being discontinued somewhat in advance of the weld point.

In accordance with another feature, which may be optionally used in the practice of the present invention, means are provided for preheating the gap edges before they arrive at the above-mentioned contacts, this being accomplished by dividing the current flow from the contacts between two paths electrically in parallel, one path being subsequent to the contacts as above described, and the other path extending in advance of the contacts. And the relative amounts of current following these two paths may be adjusted by adjusting the positions of the contacts to provide different relative rates of preheating and final heating.

Various further and more specific objects, features and advantages of the invention will appear from the description given below, taken in connection with the accompanying drawings illustrating by way of example certain preferred forms of the invention.

In the drawings:

Fig. 1 is a somewhat schematic perspective view of one embodiment of the invention;

Fig. 2 is a similar view of portions of the arrangement of Fig. 1, but of a somewhat modified form.

Figure 3:
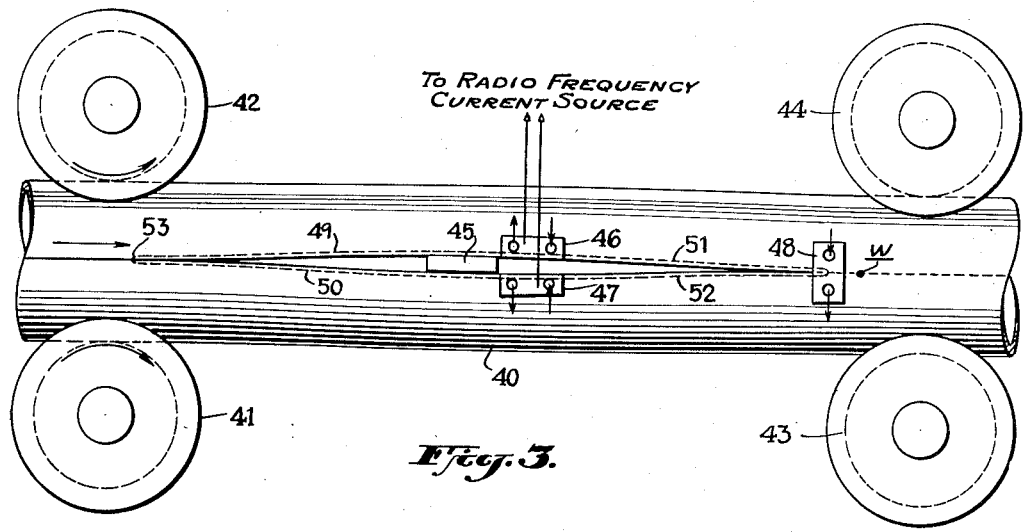
Fig. 3 is a plan view showing a length of tubing passing through a tube mill and with another alternative contact arrangement for carrying out a further variation of the method of the invention.

Referring now to Fig. 1 in further detail, a length of tubing 10 having a longitudinal gap 11 is shown being advanced, in the direction indicated by the arrow, through a tube mill and between rollers as at 12 and 13 pressing against the tubing for closing the longitudinal gap as the gap edges become welded together. A pair of contacts 14 and 15 are suitably mounted and preferably slidably (although not necessarily slidably) engage the tubing respectively at or closely adjacent the gap edges. These contacts may be adjustably mounted by any suitable means (not shown) and are insulated from each other and preferably each contains cavities such as at 16 for receiving water or other circulating cooling fluid continuously passing therethrough as indicated by the arrows. These contacts, as indicated, are connected respectively to the two terminals of a source of radio frequency current. Preferably such current has a frequency of the order of 300,000 or 400,000 cycles per second or higher, although radio frequencies down to 100,000 cycles or even 10,000 cycles might, if desired, be used, in case the readily available generators are of such lower frequencies.

A conductor member, preferably in the form of a roller at 17, is provided, having two flange portions as at 18 and 19 adapted respectively to engage the metal of the tubing at opposite sides of the V-shaped gap somewhat in advance of the point where such gap is closed and welded. Preferably the flanges 18, 19, or the equivalent, are so positioned that they will be spaced somewhat from the hot metal at the opposite edges of the gap, or at least spaced back away from the hottest portions, so that they will not contact with any molten metal or need to be cooled.

The weld point may occur shortly following the position of member 17, viz. the point at which the gap edges are finally pressed together and welded. This point does not appear in Fig. 1 as it is obscured by the member 17.

The roller member 17 may be suitably mounted as by a yoke 21 carried by a bracket 22 which is preferably somewhat resilient so as to press the member 17 down against the tubing, such bracket also preferably being adjustable both vertically and longitudinally of the path of the tubing as by screw and slot means, such as indicated at 23 and 24 for example.

With the apparatus as thus far described, it will be apparent that a path of radio frequency current is provided from the source through contact 14 and along on one edge portion of the V-shaped gap as indicated by the dash line 25, thence into the flange 19 and into the other flange 18 on member 17 and back along the other edge of the V-shaped gap as indicated by dash line 26, into the contact 15 and thence to the current source.

As explained in our above-mentioned application Serial No. 421,768, magnetic core means such as a plurality of rods 27, may be suitably mounted and retained in position within the tubing, such rods for example being formed of a composition of sintered magnetic oxide and insulation material of well-known types which have a low loss factor and high volume resistivity (for example such as the material marketed under the name Ferramic by General Ceramic & Steatite Corp.). However, this core means may be of any other form of material which will have a permeability (mu) greater than 1, preferably substantially greater, and such that eddy current losses therein will be minimized, for example, laminated iron such as often used as magnetic core material for electrical apparatus generally. This magnetic core means preferably extends from a position in advance of the contacts 14, 15 within the tube and to a region beneath or nearly beneath the weld point. Such core means makes it possible to increase the inductance of the circumferential current paths around the tubing from one contact to the other by as much as 8–10 times for example, and if core means having low resistivity is selected, the losses of power are not appreciably increased beyond that would occur in the absence of such core means. As a consequence, current flowing from the contacts 14, 15 to and from the member 17 along the V-gap edges will be increased enough so that the concentration of current along the paths indicated by the dash lines 25, 26 will be considerably greater, enabling the tubing to be run through the tube mill and welded at a faster rate.

In cases where it may be desired to preheat the tube gap edges prior to their arrival at the contacts 14, 15, then as shown in Fig. 1, an additional contact member 30 may be interposed between the edge surfaces in the gap and to interconnect such edge surfaces at some point in advance of the contacts 14, 15. This will cause the current from the radio frequency source to be divided into two paths, viz. first the path along the dash lines 25, 26 above described, and second, another path along the dash lines 31 and 32, that is, a path for example running from contact 14 along line 32 into contact 30 and thence back along line 33 to the contact 15. It may be noted that the contact 30 being positioned to engage the two opposed edge surfaces in the gap, will insure that some of the preheating current will flow along on the very edge surfaces which are to be welded together.

In order to vary the relative portion of the current which follows the preheating and the final heating paths above described, the longitudinal position of the contacts 14, 15 with respect to the contacts 17 and 30 may be adjusted so that either one path or the other will have the greater length and greater reactance and thus the lesser proportion of the current.

In case it is not desired to provide a preheating current path as above described, it will be understood that the contact 30 may simply be omitted in Fig. 1. This contact if used is preferably formed with a cavity as at 34, for containing circulating cooling fluid.

With the form of the invention shown in Fig. 2, contacts as at 14', 15' may be provided having a construction and purpose like those at 14, 15 of Fig. 1. In Fig. 2, however, the contact member 17' in lieu of being of roller form, as is contact 17 of Fig. 1, is here shown as a contact adapted to slidably engage surface portions on the tube at opposite sides of the gap somewhat in advance of the weld point w. The contact 17' as shown, preferably has its portions which slidably engage the tubing, positioned at areas somewhat remote from the tube gap edges and yet serving to conduct the current from path 25' over to the path 26'. As indicated, contact 17', if desired, may be formed with a cooling fluid passage as indicated at 35.

As in the case with the contacts 17 in Fig. 1, the contact 17' of Fig. 2 will in effect serve to "short circuit" the radio frequency current path somewhat in advance of the weld point w so that maximum heating of the gap edges occurs in advance of the weld point and no current or substantially no current or electromagnetic field or arcing effects occur at the weld point.

If, with the embodiment of Fig. 2, it is desired to provide a preheating current path, a contact such as at 30' may be provided with under portions positioned slidably to engage surfaces on the tubing respectively at each side of the gap 11', thereby providing a preheating current path as indicated by the dash lines 32', 33'. It will be understood, of course, that a contact like that at 30 of Fig. 1 might be used in lieu of the contact 30'. It will be understood that the preheating contact means 30 or 30' may be used whether or not the bridging contacts as at 17, 17' are used.

With the form of the invention shown in Fig. 3, a length of tubing 40 is shown being advanced through a tube mill having pressure rollers as at 41, 42 for causing the tube gap to be closed prior to its arrival at the welding region and another pair of pressure rollers as at 43, 44 for causing the gap to be closed at or adjacent the region of the weld point w while at a point intermiate these two pairs of rollers, the gap is held open by a suitable spreader element 45 located therein. Here a pair of contacts 46, 47 are provided having a construction and purpose like those at 14, 15 in Fig. 1. Also a contact member 48 is provided, which may be of a construction and purpose like either the contact 17' of Fig. 2 or the contact member 17 of Fig. 1. The spreader element 45 may be made of a suitable wear-resistant insulating material and in that case it will be apparent that a preheating current path will be formed as indicated by the dash lines 49, 50 and a final heating current path as indicated by the dash line 51, 52. That is, the preheating current will be free to flow from contact 46 back along one edge of the opening gap to the closed point 53, thence back along the other gap edge to the contact 47. If the contacts 46, 47 are positioned as shown, nearer to the contact 48 than to the point 53, then it will be apparent that the current path 49, 50 will have greater length and reactance than the path 51, 52 and thus the preheating current, as may be desirable, will be somewhat less than the final heating current which is to heat the gap edges to hot welding temperature as they arrive at contact 48.

It will be understood that the method of Fig. 3 may be used either with or without the contact 48 and that if such contact is omitted, the current path 51, 52 will extend to the weld point, that is the point where the two tube edges come into engagement.

It will be understood that with the arrangement of Fig. 3, magnetic core means as at 27 in Fig. 1 may also be provided, if desired.

With all forms of the invention, the contacts such as at 14, 15, if preferred, may be inserted into the gap to slidably engage respectively the opposed edge surfaces, and as shown in our above-identified applications.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed is:

1. Method for welding together the edges of a longitudinal gap in metal tubing which comprises: longitudinally advancing the tubing while subjecting same to pressure from opposite sides thereof to bring the gap edges together adjacent a welding point, while heating said edges to welding temperature by applying contacts connected to a source of radio frequency current to points on the tubing at opposite sides of the gap at a position in advance of said welding point, and while also applying an electrical connection between opposite sides of the gap at a position shortly in advance of the welding point, said current being of such radio frequency that because of its frequency, a low impedance path therefor in the metal of the tubing between the contacts is provided along on the approaching gap edges from the contacts to and from said connection, the resulting current flow and consequent resistance heating being concentrated at such edges, and acting to continue to increase the temperature thereof until same reach said connection.

2. Method for welding together the edges of a longitudinal gap in metal tubing which comprises: longitudinally advancing the tubing while the gap edges thereon are being brought together substantially at a welding point, while heating said edges to welding temperature by applying contacts connected to a source of radio frequency current to points on the tubing at opposite sides of the gap and at a position in advance of said welding point, and while also electrically connecting opposite sides of the gap together at a location just before said welding point, said current being of such radio frequency that because of its frequency it will find a low impedance path in the metal of the tube along on the approaching gap edges from the contacts to and from said connection and the resulting current flow and consequent resistance heating will be concentrated at said edges and act to continue to increase the temperature thereof until same reach said connection.

3. Method in accordance with claim 2 and in which another connection is provided between the gap edges in advance of said contacts, whereby a preheating current path is provided from said contacts to and from said other connection.

4. Method in accordance with claim 2, in which the gap edges are brought together in advance of the contacts and spread apart to provide a gap adjacent the region where the contacts are applied, whereby a path for preheating current is provided in advance of the contacts, such path extending from the contacts back to and from a point where the gap is in closed condition in advance of the contacts.

5. Method for welding together the edges of a longitudinal gap in metal tubing which comprises: longitudinally advancing the tubing while the gap edges thereon are being brought together substantially at a welding point, while heating said edges to welding temperature by applying contacts conected to a source of radio frequency current to points on the tubing at opposite sides of the gap and at a position in advance of said point, and while also in advance of said contacts maintaining a connection between the opposite sides of the gap, thereby providing a high frequency low reactance preheating current path extending from the contacts along the gap edges to and from said connection as well as a final heating current path extending from the contacts along the gap edges to and from the region of the weld point.

6. Method in accordance with claim 5 in which the connection in advance of the contacts is provided by bringing the gap edges into contact substantially in advance of the weld point, such edges again being separated at the region of the contacts before being brought together again at the region of the weld point.

7. Apparatus for welding together the edges of a longitudinal gap in metal tubing which comprises: means for longitudinally advancing the tubing while subjecting same to pressure at opposite sides of the gap to bring such edges together substantially at a welding point in a narrow V-shaped formation; a pair of contacts mounted respectively to be engaged by surfaces of the metal of the tubing along opposite sides of the gap at a position in advance of said point; means providing a supply of radio frequency current connected to said contacts; and a conductor member engaging and acting to interconnect the opposite sides of the gap at a position substantially immediately preceding the weld point, whereby a radio frequency low reactance current path is formed from the contacts along the gap edges to and from said connection.

8. Apparatus in accordance with claim 7, in which said connection comprises a rotatable member having two portions respectively which have rolling contact with the metal of the tubing at opposite sides of the gap and at points spaced from the gap edges.

9. Apparatus in accordance with claim 7, in which said connection is formed with two surface areas respectively which engage the metal of the tubing at opposite sides of the gap and at points somewhat spaced from the gap edges.

10. Apparatus in accordance with claim 7, in which another connection is provided in advance of the contacts for interconnecting the gap edges, thereby to provide a preheating current path from the contacts to and from such other connection along the gap edges.

11. Apparatus in accordance with claim 7, in which means are provided to bring the gap edges together in advance of the contacts and an insulating spreader member is provided to hold the gap edges separated at the region of the contacts and before they are brought together again adjacent the weld point.

12. Method in accordance with claim 5 and in which said connection comprises a metal member in said gap and against which said gap edges slidably engage.

13. Apparatus for welding together the edges of a longitudinal gap in metal tubing which comprises: means for longitudinally advancing the tubing while subjecting same to pressure at opposite sides of the gap to bring such edges together substantially at a welding point in a narrow V-shaped formation; a pair of contacts mounted respectively to be engaged by surfaces of the metal of the tubing along opposite sides of the gap at a position in advance of said point; means providing a supply of radio frequency current connected to said contacts; and a conductor member engaging and acting to interconnect the opposite sides of the gap at a position substantially in advance of the position of said contacts thereby providing a high frequency low reactance preheating current path extending from the contacts along the gap edges to and from said connection as well as a final heating current path extending from the contacts along the gap edges to and from the region of the weld point.

References Cited in the file of this patent

UNITED STATES PATENTS

| | | |
|---|---|---|
| 1,915,047 | Blakeslee | June 20, 1933 |
| 2,020,276 | Crawford | Nov. 5, 1935 |
| 2,086,305 | Sessions | July 6, 1937 |
| 2,139,211 | Sessions | Dec. 6, 1938 |